US009122665B2

(12) United States Patent
Doan et al.

(10) Patent No.: US 9,122,665 B2
(45) Date of Patent: Sep. 1, 2015

(54) RICH FORMATTING FOR A DATA LABEL ASSOCIATED WITH A DATA POINT

(75) Inventors: Christopher Doan, Redmond, VA (US); Benjamin Edward Rampson, Woodinville, WA (US); Robin Wakefield, Seattle, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 13/269,877

(22) Filed: Oct. 10, 2011

(65) Prior Publication Data

US 2013/0091413 A1    Apr. 11, 2013

(51) Int. Cl.
G06F 17/00    (2006.01)
G06F 17/24    (2006.01)
G06F 17/30    (2006.01)

(52) U.S. Cl.
CPC .............. *G06F 17/24* (2013.01); *G06F 17/241* (2013.01); *G06F 17/3028* (2013.01)

(58) Field of Classification Search
CPC ... G06F 17/241; G06F 17/24; G06F 17/3028; G06F 17/30861
USPC .................. 715/227, 230, 231, 232
See application file for complete search history.

(56) References Cited

U.S. PATENT DOCUMENTS

| | | | |
|---|---|---|---|
| 5,701,499 A | 12/1997 | Capson et al. | |
| 7,703,007 B2 | 4/2010 | Collie et al. | |
| 7,961,188 B2 | 6/2011 | Tolle et al. | |
| 2005/0068320 A1* | 3/2005 | Jaeger | 345/440 |
| 2006/0136808 A1 | 6/2006 | Chirilov et al. | |
| 2011/0137917 A1* | 6/2011 | Boland et al. | 715/230 |
| 2012/0110472 A1* | 5/2012 | Amrhein et al. | 715/753 |
| 2013/0031457 A1* | 1/2013 | Griffiths et al. | 715/231 |

OTHER PUBLICATIONS

Mark Dodge and Craig Stinson, Microsoft Excel 2010 Inside Out, Aug. 26, 2010, Microsoft Press, pp. 1-26.*
Contextures, Excel Comments Programming, Jan. 2, 2010, Contextures.com, pp. 1-12.*
Website information entitled, "The Designer Interface," published Jun. 20, 2011. Website: http://www.quadbase.com/espressreport/help/manual/Designer5.html; 59 pages.
Cynergy Software, "The Easiest Way to Create and Style .Net Reports," published Jan. 2011, http://www.cynergysoftware.com/wp-content/uploads/2011/01/Telerik-Reporting.pdf; 28 pages.

(Continued)

*Primary Examiner* — Kavita Padmanabhan
*Assistant Examiner* — Ariel Mercado
(74) *Attorney, Agent, or Firm* — Steve Crocker; Danielle Johnston-Holmes; Micky Minhas

(57) ABSTRACT

Rich formatting may be provided for rich data labels. A rich data label may be created for at least one data point associated with a visualization. The data label may be formatted and displayed on the visualization. The rich data label may be bind to a particular data point rather than adhering to conventional index-based anchor logic where a data label is bound to the index of a data point. Accordingly, in response to determining that the location of the data point has changed in the visualization, the location of the rich data label is automatically adjusted to remain attached to its original data point.

10 Claims, 4 Drawing Sheets

(56) References Cited

OTHER PUBLICATIONS

Microsoft Corporation, "Top Tips for Excel: Charts and Graphics," published 2011. Website: http://office.microsoft.com/en-us/excel-help/top-tips-for-excel-charts-and-graphics-HA001084158.aspx, 3 pages.

Microsoft Corporation, "Add or Remove Data Labels in a Chart," published Jul. 26, 2011. Website: http://office.microsoft.com/en-us/excel-help/add-or-remove-data-labels-in-a-chart-HP001234166.aspx, 4 pages.

* cited by examiner

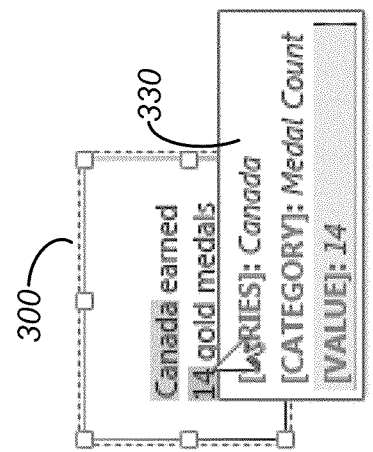
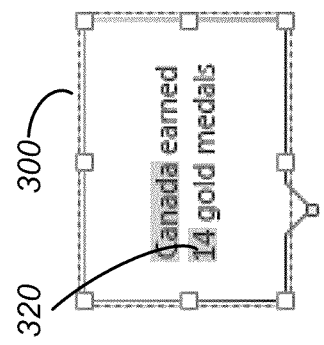
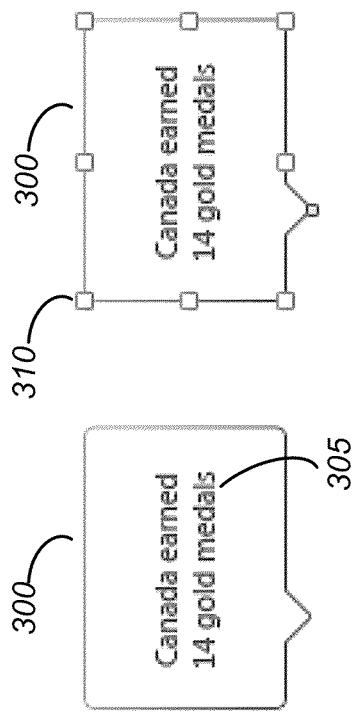
FIG. 3A  FIG. 3B  FIG. 3C  FIG. 3D

RICH FORMATTING FOR A DATA LABEL ASSOCIATED WITH A DATA POINT

BACKGROUND

Rich formatting may be provided for data labels. Conventional data labels—callouts that may be used to enhance understanding of a display like a chart by highlighting, emphasizing, and/or providing more information about particular data points—suffer from a number of drawbacks. In some situations, data labels are rectangular, cannot be manually resized and do not offer rich formatting controls such as justification, margins, and columns. Furthermore, data labels do not follow the data point they are intended to enhance if the data is sorted or filtered. Also, current data label systems are limited to a single data point and cannot pull from a range of data. For example, if the third data point in a series is orange and has a data label, these properties are stored on "Data Point #3". If a chart event occurs that causes the indices of the data points to change (e.g. if the data is sorted), these properties remain on "Data Point #3", despite it not necessarily being the data point that the user had originally intended to format.

SUMMARY

This Summary is provided to introduce a selection of concepts in a simplified form that are further described below in the Detailed Description. This Summary is not intended to identify key features or essential features of the claimed subject matter. Nor is this Summary intended to be used to limit the claimed subject matter's scope.

Rich data label formatting may be provided. A rich data label may be created for at least one data point associated with a visualization. The data label may be formatted and displayed on the visualization. In response to determining that the change event has occurred on the visualization, the display of the formatted label may be updated according to the change event.

Both the foregoing general description and the following detailed description provide examples and are explanatory only. Accordingly, the foregoing general description and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present invention. In the drawings:

FIGS. 3A-3D are block diagrams of an example data labels;

DETAILED DESCRIPTION

Figure 1:
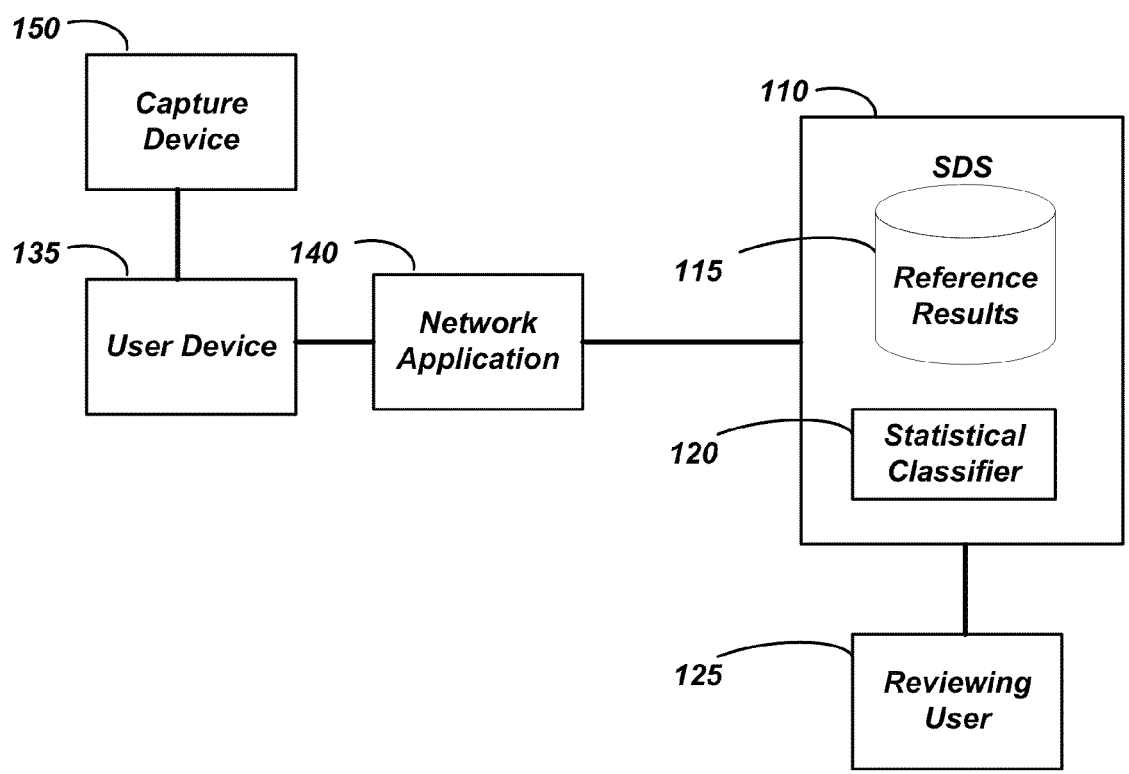
FIG. 1 is a block diagram of an operating environment.

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention.

Data labels may be used to enhance a chart by highlighting, emphasizing, and/or providing more information about particular data points in a chart. Rich data labels may allow access to relevant data fields having a correlation to the associated data point beyond those recognized by the chart, such as series and/or category names. Additionally, rich data labels may allow users to incorporate data fields and/or freeform text as well as customize the appearance, such as by manipulating the size, shape, layout and/or text formatting. Rich data labels may also bind to a particular data point rather than adhering to conventional index-based anchor logic where a data label is bound to the index of a data point, as opposed to the data point itself. Thus, if the sequence of data points changes (e.g. if the series is sorted or filtered, or if points are added/removed), a rich data label may remain attached to its original data point. By binding to the data point itself, any chart layout change may result in automatic repositioning of the rich data label.

FIG. 1 is a block diagram of an operating environment 100 for providing rich data label formatting comprising a user workstation 110. User workstation 110 may comprise a data processing application 115 and may be operative to interact with a network application 120 via a network 125. For example, user workstation 110 may be operative to connect to a spreadsheet application provided by a cloud-based server 130 that may receive inputs from user workstation 110 and perform the necessary data processing remotely from user workstation 110. User workstation 110 may comprise, for example, an electronic communications device such as a computer, laptop, cellular and/or IP phone, tablet, game console and/or other device. User workstation 110 may be coupled to a capture device 150, that may be operative to record a user and capture spoken words, motions and/or gestures made by the user, such as with a camera and/or microphone. User device 135 may be further operative to capture other inputs from the user such as by a keyboard, touchscreen, stylus and/or mouse (not pictured). Consistent with embodiments of the invention, capture device 150 may comprise any speech and/or motion detection device capable of detecting the speech and/or actions of the user. For example, capture device 150 may comprise a Microsoft® Kinect® motion capture device comprising a plurality of cameras and a plurality of microphones.

Figure 2:
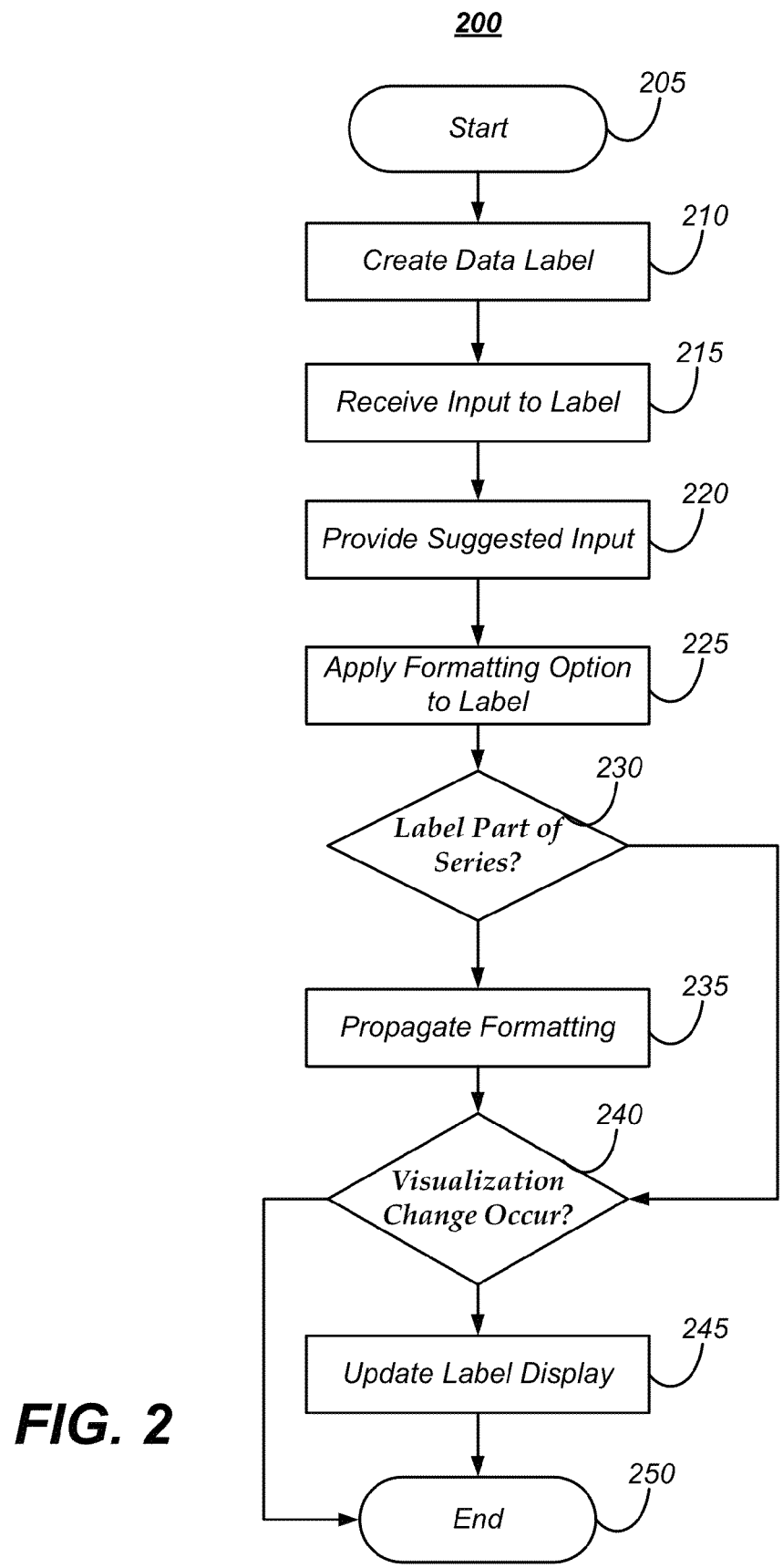
FIG. 2 is a flow chart of a method for providing rich data label formatting.

FIG. 2 is a flow chart setting forth the general stages involved in a method 200 consistent with an embodiment of the invention for providing rich data label formatting. Method 200 may be implemented using a computing device 400 as described in more detail below with respect to FIG. 4. Ways to implement the stages of method 200 will be described in greater detail below. Method 200 may begin at starting block 205 and proceed to stage 210 where computing device 400 may create a data label for at least one data point associated with a visualization. For example, a user of data processing application 115 may select a data point on a graph to create a rich data label 300, as described in greater detail below with respect to FIG. 3. The data label may comprise a reference to a data value and/or a range of data values such as may be stored in a spreadsheet cell and/or plurality of cells. Such a plurality of cells may be contiguous but need not be.

Method 200 may then advance to stage 215 where computing device 400 may receive an input to the data label. For example, a user may begin typing label content into the label.

Method 200 may then advance to stage 220 where computing device 400 may provide a suggested input for the data label according to the received text input. For example, where a user begins typing in the name of a series in the data set underlying the visualization (e.g., spreadsheet cell values used to create a table, graph, chart, etc.) an auto-completion suggestion may be displayed. Possible data fields may also be suggested, such as header titles that may be related to the at least one data point for which the label was created. As such, the suggestion may comprise a field selector control proximate to the data label.

Method 200 may then advance to stage 225 where computing device 400 may apply a formatting option to the data label. For example, a formatting option may be received from the user for the data label. Such a formatting option may comprise a data field selection, a data value selection, a data value range selection, a label shape option, a text formatting option, and/or a text alignment option.

Method 200 may then advance to stage 230 where computing device 400 may determine whether the data label is one of a plurality of data labels associated with a range of data values. For example, a series of data values may be associated with a line on a graph (e.g., revenue per year). Each data point of the line may be associated with a data label that may provide additional information (e.g., a percentage change value or a comparison to a competitor's revenue in that year).

If the data label is part of a range and/or series, method 200 may advance to stage 235 where computing device 400 may propagate the formatting change to each of the rest of the plurality of data labels. For example, the user may apply a formatting change at stage 225, such as changing the font of the data label's text and/or changing the shape of the data label. In the line graph example described above, these formatting changes may be propagated to each of the other data labels associated with data points in that series.

After propagating the formatting at stage 235, or if the data label was not determined to be part of a series at stage 230, method 200 may then advance to stage 240 where computing device 400 may determine whether a change event has occurred on the visualization. For example, a change event may comprise a data sort, a data hide, a data filter, a data addition, a resize of the visualization, a change in a type of the visualization, and/or a data deletion.

If a change event has occurred, method 200 may advance to stage 245 where computing device 400 may update the display of the formatted label. For example, the data label may comprise a reference to the underlying data value associated with the data point on the visualization. If the location of the data point changes on the visualization, the data label may be able to follow that data point by recognizing that the new location is still tied to the same underlying data value. The data label may then be repositioned on the visualization relative to the data point's new location. After updating the display of the data label, or if no change event was detected at stage 240, method 200 may end at stage 250.

FIG. 3A is a block diagram of a rich data label 300. Data label 300 may comprise a label content 305 designed to provide additional callout information to a data point on a visualization.

FIG. 3B is a block diagram of rich data label 300 illustrating a user interface indication 310 that rich data label 300 has been selected by the user.

FIG. 3C is a block diagram of rich data label 300 illustrating a content highlighting of a data field reference 320 providing information to the user that the highlighted text comprises data fields. For example, "Canada" and "14" are highlighted to indicate that these values are tied to underlying data. A series of data labels may be copied across a visualization with each label referencing different underlying data. For example, the next data label may have "China" instead of "Canada." Such data fields may also be automatically updated when the underlying data is changed.

FIG. 3D is a block diagram of rich data label 300 illustrating a data field suggestion 330. Upon selecting and/or hovering over data field reference 320, data field suggestion 330 may be displayed to provide additional information about the underlying data and related data fields, such as other data in the series and/or series and category name information.

An embodiment consistent with the invention may comprise a system for providing data label formatting. The system may comprise a memory storage and a processing unit coupled to the memory storage. The processing unit may be operative to create a label for at least one data point associated with a visualization, format the label, display the formatted label on the visualization, and determine whether a change event has occurred on the visualization. In response to determining that the change event has occurred on the visualization, the processing unit may be operative to update the display of the formatted label according to the change event.

Another embodiment consistent with the invention may comprise a system for providing data label formatting. The system may comprise a memory storage and a processing unit coupled to the memory storage. The processing unit may be operative to create a data label associated with at least one data point of a visualization, display a user interface control associated with the data label, receive the selection of the user interface control, display a plurality of formatting options associated with a data label associated with the at least one data point, receive a formatting input associated with at least one of the plurality of formatting options, apply the formatting input to the at least one data point, and display the formatted data label on the visualization.

Yet another embodiment consistent with the invention may comprise a system for providing data label formatting. The system may comprise a memory storage and a processing unit coupled to the memory storage. The processing unit may be operative to create a data label for at least one data point associated with a visualization, wherein the data label comprises a reference to at least one data value associated with the at least one data point receive a text input to the data label, provide a suggested input for the data label according to the received text input, provide a field selector control proximate to the data label while receiving the text input, evince a formatting option for the data label, wherein the formatting option comprises at least one of the following: a data field selection, a data value selection, a data value range selection, a label shape option, a text formatting option, and a text alignment option, apply the formatting option to the data label, and determine whether the data label is one of a plurality of data labels associated with a range of data values. In response to determining that the data label is one of the plurality of data labels associated with the range of data values, the processing unit may be operative to propagate the formatting change to each of the rest of the plurality of data labels. The processing unit may be further operative to determine that a change event has occurred on the visualization and, if so, update the display of the formatted label according to the change event according to a new location of the at least one data point.

Figure 4:
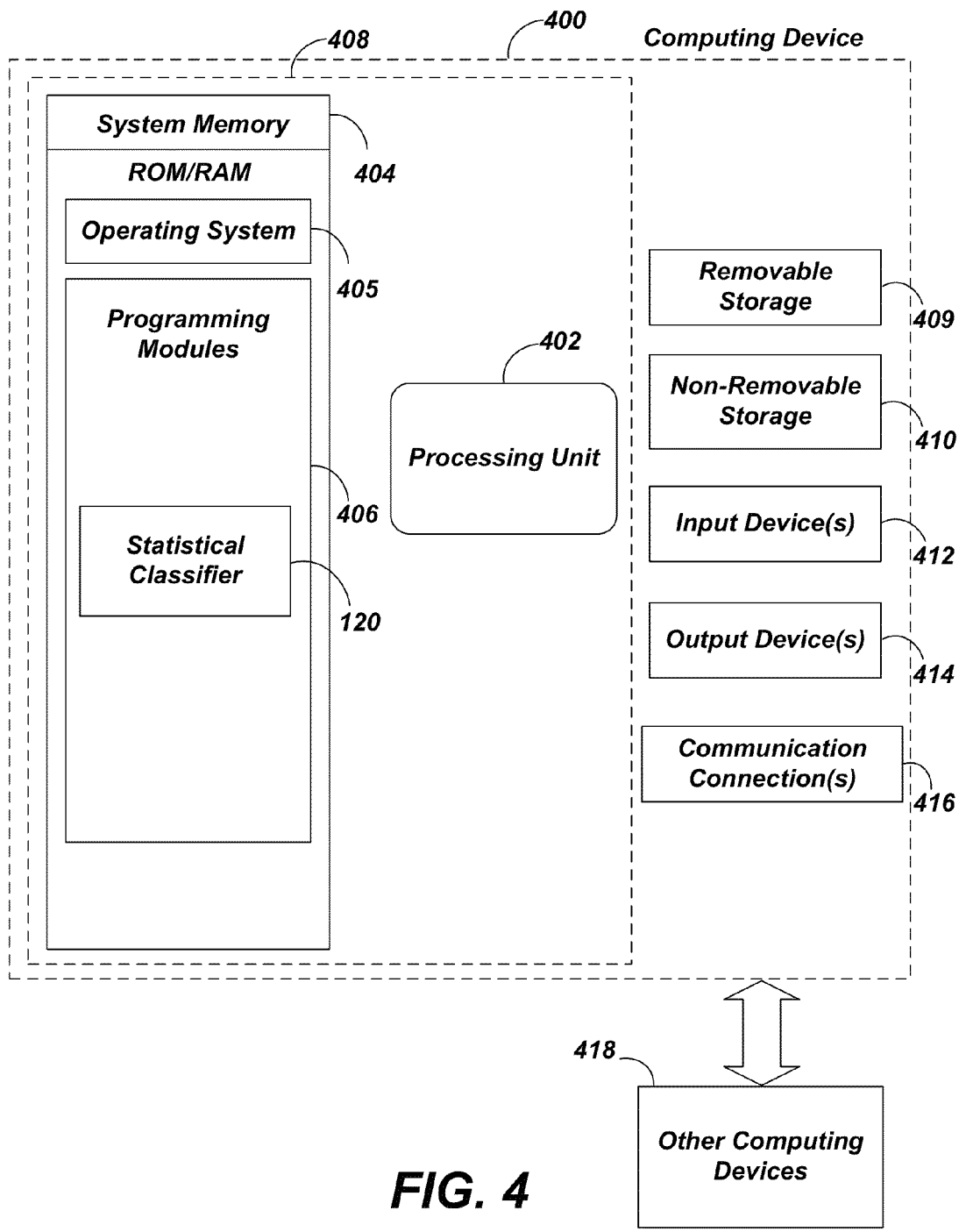
FIG. 4 is a block diagram of a computing device.

FIG. 4 is a block diagram of a system including computing device 400. Consistent with an embodiment of the invention, the aforementioned memory storage and processing unit may be implemented in a computing device, such as computing device 400 of FIG. 4. Any suitable combination of hardware, software, or firmware may be used to implement the memory storage and processing unit. For example, the memory storage and processing unit may be implemented with computing device 400 or any of other computing devices 418, in combination with computing device 400. The aforementioned system, device, and processors are examples and other systems, devices, and processors may comprise the aforementioned memory storage and processing unit, consistent with embodiments of the invention. Furthermore, computing device 400 may comprise operating environment 400 as described above. Methods described in this specification may operate in other environments and are not limited to computing device 400.

With reference to FIG. 4, a system consistent with an embodiment of the invention may include a computing device, such as computing device 400. In a basic configuration, computing device 400 may include at least one processing unit 402 and a system memory 404. Depending on the configuration and type of computing device, system memory 404 may comprise, but is not limited to, volatile (e.g. random access memory (RAM)), non-volatile (e.g. read-only memory (ROM)), flash memory, or any combination. System memory 404 may include operating system 405, one or more programming modules 406, and may include data processing application 115. Operating system 405, for example, may be suitable for controlling computing device 400's operation. Furthermore, embodiments of the invention may be practiced in conjunction with a graphics library, other operating systems, or any other application program and is not limited to any particular application or system. This basic configuration is illustrated in FIG. 4 by those components within a dashed line 408.

Computing device 400 may have additional features or functionality. For example, computing device 400 may also include additional data storage devices (removable and/or non-removable) such as, for example, magnetic disks, optical disks, or tape. Such additional storage is illustrated in FIG. 4 by a removable storage 409 and a non-removable storage 410. Computing device 400 may also contain a communication connection 416 that may allow device 400 to communicate with other computing devices 418, such as over a network in a distributed computing environment, for example, an intranet or the Internet. Communication connection 416 is one example of communication media.

The term computer readable media as used herein may include computer storage media. Computer storage media may include volatile and nonvolatile, removable and non-removable media implemented in any method or technology for storage of information, such as computer readable instructions, data structures, program modules, or other data. System memory 404, removable storage 409, and non-removable storage 410 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 400. Any such computer storage media may be part of device 400. Computing device 400 may also have input device(s) 412 such as a keyboard, a mouse, a pen, a sound input device, a touch input device, etc. Output device(s) 414 such as a display, speakers, a printer, etc. may also be included. The aforementioned devices are examples and others may be used.

The term computer readable media as used herein may also include communication media. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

As stated above, a number of program modules and data files may be stored in system memory 404, including operating system 405. While executing on processing unit 402, programming modules 406 (e.g., data processing application 115) may perform processes and/or methods as described above. The aforementioned process is an example, and processing unit 402 may perform other processes. Other programming modules that may be used in accordance with embodiments of the present invention may include electronic mail and contacts applications, word processing applications, spreadsheet applications, database applications, slide presentation applications, drawing or computer-aided application programs, etc.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present invention may be embodied in hardware and/or in software (including firmware, resident software, micro-code, etc.). In other words, embodiments of the present invention may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the invention may be practiced via a system-on-a-chip (SOC) where each and/or many of the components illustrated above may be integrated onto a single integrated circuit. Such an SOC device may include one or more processing units, graphics units, communications units, system virtualization units and various application functionalities, all of which may be integrated (or "burned") onto the chip substrate as a single integrated circuit. When operating via an SOC, the functionality, described herein, with respect to training and/or interacting with any component of operating environment 100 may operate via application-specific logic integrated with other components of the computing device/system on the single integrated circuit (chip).

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention.

All rights including copyrights in the code included herein are vested in and the property of the Applicants. The Applicants retain and reserve all rights in the code included herein, and grant permission to reproduce the material only in connection with reproduction of the granted patent and for no other purpose.

While certain embodiments of the invention have been described, other embodiments may exist. While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the invention.

We claim:

1. A method for providing data label formatting, the method comprising:
    creating a data label for at least one data point associated with a visualization, wherein the data label comprises a reference to at least one data value associated with the at least one data point, the data label comprising a rich data label;
    receiving a text input to the data label;
    providing a suggested input for the data label according to the received text input;
    receiving one of a plurality of different formatting options for formatting the data label, wherein the plurality of different formatting options comprises; a data field selection, a data value selection, a data value range selection, a label shape option, a text formatting option, and a text alignment option;
    applying one of the plurality of formatting options to format the data label;
    determining whether the data label is one of a plurality of data labels associated with a range of data values;
    in response to determining that the data label is one of the plurality of data labels associated with the range of data values, propagating a formatting change to each of the rest of the plurality of data labels;
    determining whether a change event has occurred on the visualization, wherein the change event comprises at least one of the following: a data sort, a data hide, a data fitter, a data addition, a resize of the visualization, a change in a type of the visualization, and a data deletion; and
    in response to determining that the change event has occurred on the visualization, updating the display of the formatted data label by automatically adjusting a location of the formatted data label according to a new location of the at least one data point in response to the change event.

2. The method of claim 1, wherein the visualization comprises at least one of the following: a chart, a table, and a graph.

3. The method of claim 1, wherein the data label comprises a text string and a data field, and wherein the data field is populated according to a property of the associated at least one data point.

4. The method of claim 3, wherein the property of the associated at least one data point comprises at least one of the following: a series name, a category name, a value, a percentage, and a size.

5. The method of claim 3, further comprising providing a user interface indication that the data field is present in the formatted data label.

6. The method of claim 1, wherein the data label is associated with a cell reference of the at least one of the data points.

7. The method of claim 1, wherein the data label comprises one of a series of data labels associated with a plurality of data points.

8. A system for providing data label formatting, the system comprising:
- a memory storage device; and
- a hardware processing unit coupled to the memory storage device, wherein the hardware processing unit is operable to:
- create a data label for at least one data point associated with a visualization wherein the data label comprises a reference to at least one data value associated with the at least one data point, the data label comprising a rich data label;
- receive a text input to the data label;
- provide a suggested input for the data label according to the received text input;
- receive one of a plurality of different formatting options for formatting the data label, wherein the plurality of different formatting options comprises: a data field selection, a data value selection, a data value range selection, a label shape option, a text formatting option, and a text alignment option;
- apply one of the plurality of formatting options to format the data label;
- determine whether the data label is one of a plurality of data labels associated with a range of data values;
- in response to the determination that the data label is one of the plurality of data labels associated with the range of data values, propagate a formatting change to each of the rest of the plurality of data labels;
- determine whether a change event has occurred on the visualization, wherein the change event comprises at least one of the following: a data sort, a data hide, a data filter, a data addition, a resize of the visualization, a change in a type of the visualization, and a data deletion; and
- in response to the determination that the change event has occurred on the visualization, update the display of the formatted data label by automatically adjusting a location of the formatted data label according to a new location of the at least one data point in response to the change event.

9. The system of claim 8, wherein the hardware processing unit is further operative to create a plurality of data labels each associated with at least one data point.

10. The system of claim 9, wherein the plurality of data labels comprise a common formatting option.

* * * * *